(12) United States Patent
Fraser

(10) Patent No.: US 8,904,699 B2
(45) Date of Patent: Dec. 9, 2014

(54) FISHING TRAVEL TOOL

(75) Inventor: Andre Paul Fraser, Mount Vernon, NY (US)

(73) Assignee: Andre Paul Fraser, Danbury, CT (US)

(*) Notice: Subject to any disclaimer, the term of this patent is extended or adjusted under 35 U.S.C. 154(b) by 427 days.

(21) Appl. No.: 13/472,465

(22) Filed: May 15, 2012

(65) Prior Publication Data

US 2013/0306506 A1 Nov. 21, 2013

(51) Int. Cl.
*A01K 97/08* (2006.01)

(52) U.S. Cl.
USPC .......................................... 43/25; 206/315.11

(58) Field of Classification Search
USPC ........................... 43/26; 206/315.11; 224/922
See application file for complete search history.

(56) References Cited

U.S. PATENT DOCUMENTS

| | | | | |
|---|---|---|---|---|
| 3,515,263 | A * | 6/1970 | Carlson | 43/26 |
| 3,624,948 | A * | 12/1971 | De Baker, Sr. | 43/26 |
| 4,261,129 | A * | 4/1981 | Ohmura | 43/25 |
| 5,040,324 | A * | 8/1991 | Rivera et al. | 43/26 |
| 5,417,354 | A * | 5/1995 | Jones | 224/613 |
| 6,343,728 | B1 * | 2/2002 | Carbone | 224/607 |
| 6,865,841 | B2 * | 3/2005 | Wieringa | 43/26 |
| 2002/0178642 | A1 * | 12/2002 | Garcia | 43/26 |

* cited by examiner

*Primary Examiner* — Christopher P Ellis

(57) ABSTRACT

A tool protects fishing equipment, such as fishing rods and reels, from damage, whether the equipment is in storage or transit. The tool provides the angler with the security that their equipment will be safe. The tool includes a hollow, tubular storage chamber having one open end for inserting an end of a fishing rod therein. The storage chamber may include a buoyant material at a closed end thereof. A flexible strap extends from the open end of the storage chamber to run along the length of the fishing rod. An adjustable loop at the end of the flexible strap is adapted to loop around the reel end of the rod and can be held in place by the reel. One or more straps can be disposed along the flexible strap to secure the flexible strap to the rod. One or more rods may be carried by the tool.

10 Claims, 3 Drawing Sheets

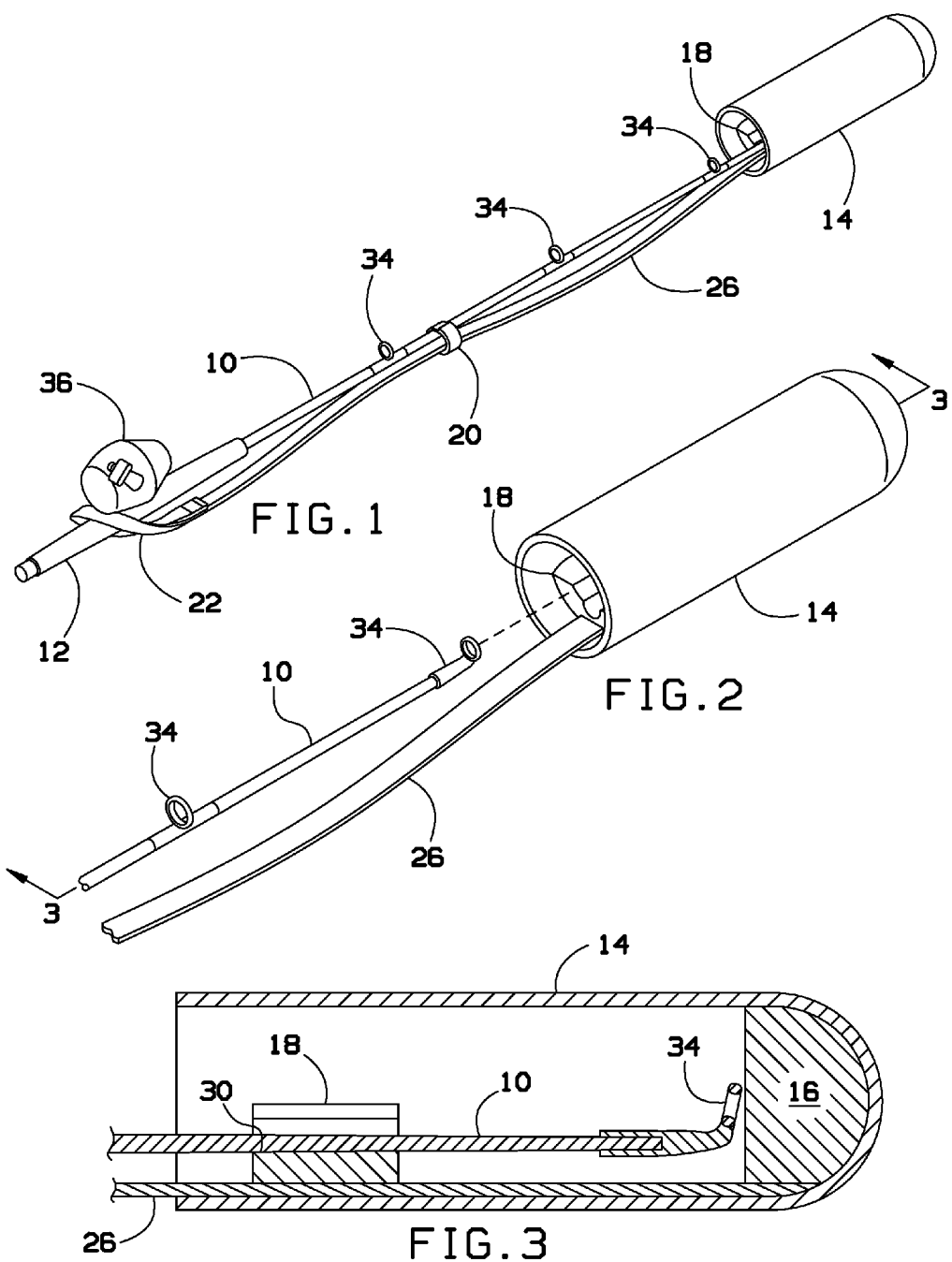

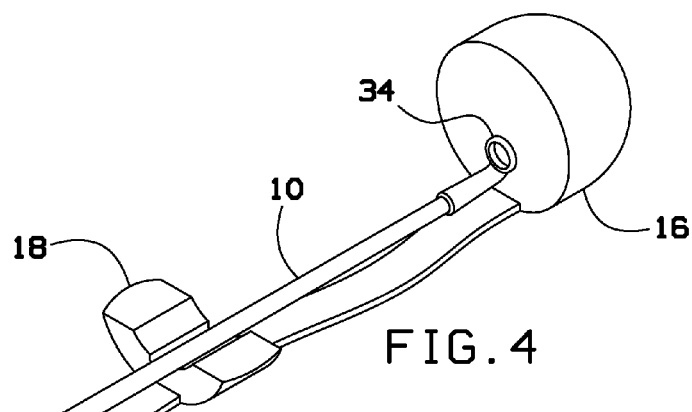
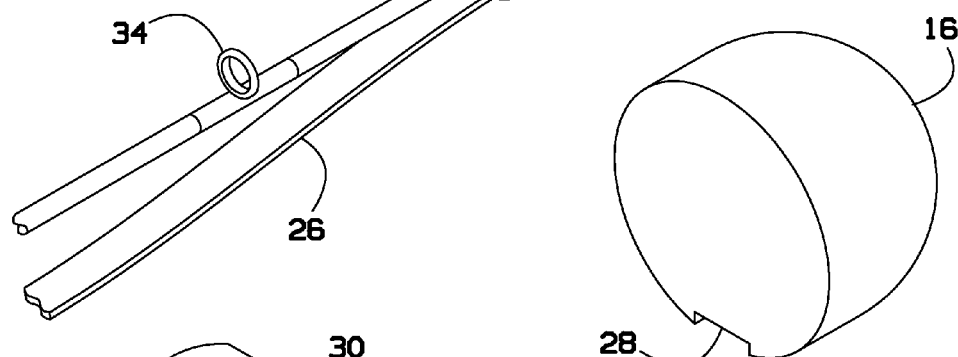
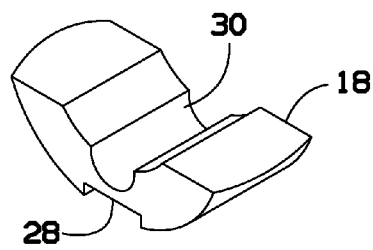
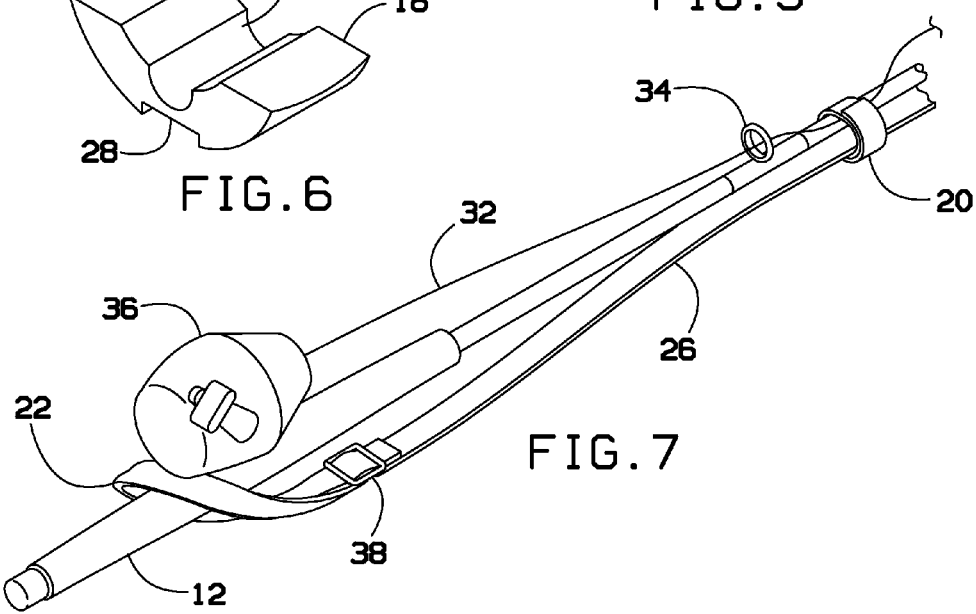

FISHING TRAVEL TOOL

BACKGROUND OF THE INVENTION

The present invention relates to fishing accessories and, more particularly, to a fishing travel tool for protecting fishing equipment from damage both while in storage or in transit.

Often times, fishing equipment gets unnecessarily damaged either in storage or transit. Current devices for storing and carrying fishing poles allow for too much movement while carrying, greatly increasing the chance for damage. Additionally, these conventional devices do not provide stability while transporting the equipment.

As can be seen, there is a need for an improved tool to help store and carry fishing equipment.

SUMMARY OF THE INVENTION

In one aspect of the present invention, a fishing tool comprises a storage chamber having an open end and a closed end; a main strap extending from the storage chamber; a loop formed on a distal end of the main strap, the loop adapted to fit about a handle of a fishing rod; and one or more fastening straps extending from the main strap between the loop and the storage chamber.

In another aspect of the present invention, a fishing travel tool comprises a storage chamber having an open end and a closed end; a buoyant material disposed at the storage chamber's closed end; a fishing rod support disposed inside the storage chamber; a main strap extending from the storage chamber; a loop formed on a distal end of the main strap, the loop adapted to fit about a handle of a fishing rod; an adjustment buckle adapted to adjust a size of the loop and a length of the main strap; and one or more fastening straps extending from the main strap between the loop and the storage chamber.

These and other features, aspects and advantages of the present invention will become better understood with reference to the following drawings, description and claims.

BRIEF DESCRIPTION OF THE DRAWINGS

FIG. 1 is a perspective view of a fishing travel tool according to an exemplary embodiment of the present invention;

FIG. 2 is a detailed perspective view showing a fishing rod being removed from a storage cylinder of the fishing travel tool of FIG. 1;

FIG. 3 is a cross-sectional view taken along line 3-3 of FIG. 2;

FIG. 4 is a detailed perspective view of a fishing rod in the storage cylinder of the fishing travel tool of FIG. 1, with the storage cylinder removed for clarity;

FIG. 5 is a perspective view of a buoyant material insert for the storage cylinder of the fishing travel tool of FIG. 1;

FIG. 6 is a perspective view of a fish rod support disposed in the storage cylinder of the fishing travel tool of FIG. 1;

FIG. 7 is a detailed perspective view of a flexible fastening strap and rod handle loop securing a reel end of a fishing pole in the fishing travel tool of FIG. 1;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a tool to protect fishing equipment, such as fishing rods and reels, from damage, whether the equipment is in storage or in transit. The tool provides the angler with the security that their equipment will be safe. The tool includes a hollow, tubular storage chamber having one open end for inserting an end of a fishing rod there into. The storage chamber may include a buoyant material at a closed end thereof. A flexible strap extends from the open end of the storage chamber to run along the length of the fishing rod. An adjustable loop at the end of the flexible strap is adapted to loop around the reel end of the rod and can be held in place by the reel. One or more straps can be disposed along the flexible strap to secure the flexible strap to the rod. One or more rods may be carried by the tool.

Figure 8:
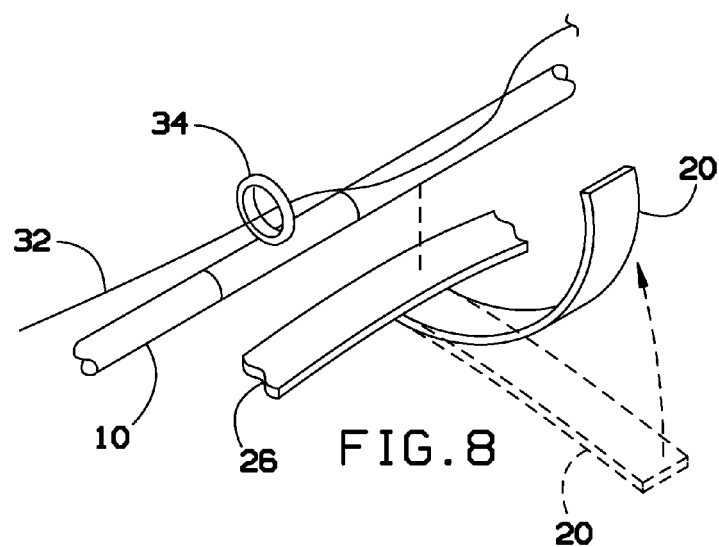
FIG. 8 is a detailed perspective view of a flexible fastening strap used to secure a fishing pole to a flexible main strap of the fishing travel tool of FIG. 1.
Figure 9:
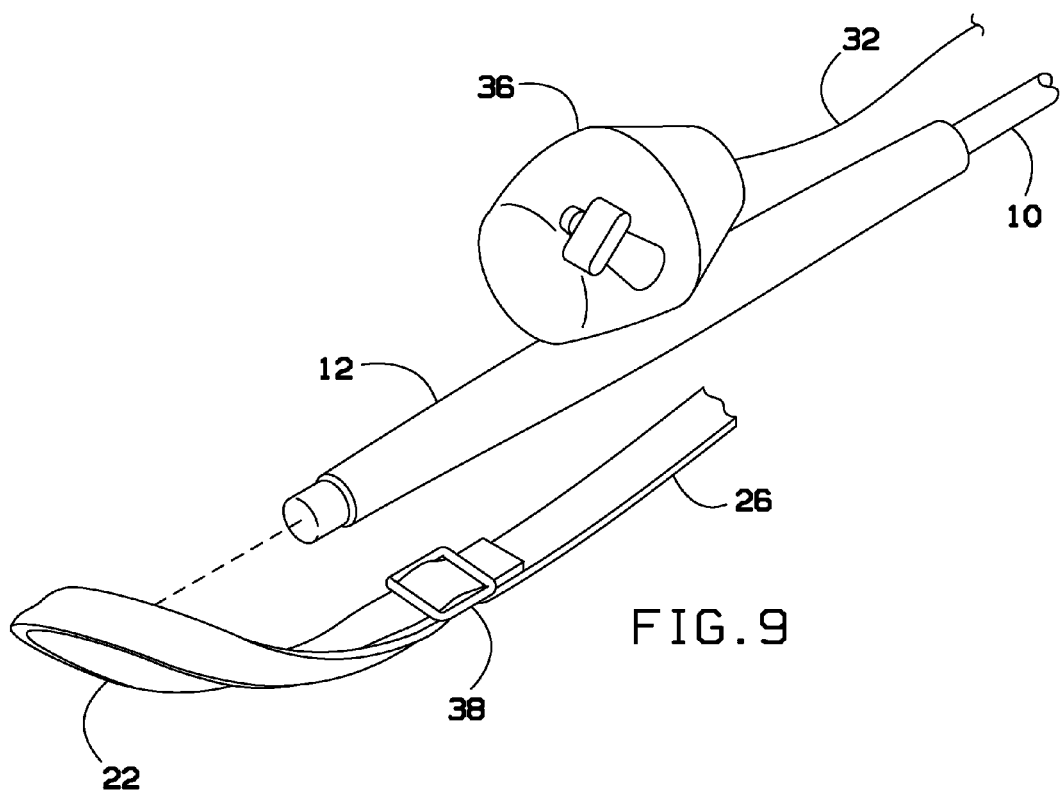
FIG. 9 is a detailed perspective view showing a rod handle loop and adjustment buckle removed from the end of a fishing rod.

Referring now to FIGS. 1 through 9, a fishing travel tool (also referred to simply as the tool) may include a hollow, tubular storage chamber 14 having an open end and a closed end. The storage chamber 14 may be a cylindrical storage chamber, for example, but other shapes are contemplated within the scope of the present invention. The storage chamber 14 may be from about 4 to about 18 inches in length, typically about 6-12 inches in length and from about 0.5 to about 4 inches in diameter. Typically, the storage chamber 14 may hold the fishing rod 10 along with one or more of its fishing line guides 34 therewithin. The storage chamber 14 may be made of various materials, such as a metal alloy, plastic, composite or the like.

A buoyant material 16 may be disposed inside the storage chamber 14 adjacent to its closed end. The buoyant material 16 may be useful for loss prevention, as a rod and reel disposed inside the tool and lost overboard will be able to float due to the buoyant nature of the buoyant material 16. The buoyant material 16 is shown in FIGS. 4 and 5 as a flat surface. However, in some embodiments, the buoyant material 16 may have a concave surface to keep the storage chamber balanced and prevent movement and stabilize the tips of the rods.

A fishing rod support 18 may also be disposed inside the storage chamber 14, proximate to its open end. The fishing rod support 18 may be formed in various shapes, for example, as shown in FIG. 6, the fishing rod support 18 may be crescent shaped with a guide slot 30 cut therein to help guide fishing rods 10 into the storage chamber 14.

A main strap 26 may run from the storage chamber 14 and be sized to extend the length of the fishing rod 10. The main strap 26 may connect to the storage chamber 14 near its open end. In some embodiments, as shown in FIGS. 3 and 4, for example, the main strap 26 may extend to the closed end of the storage chamber 14. In this embodiment, a notch 26 may be formed in the buoyant material insert 16 and the fishing rod support 18 to allow the main strap 26 to pass through the storage chamber and out its open end.

The main strap 26 may be from about 0.75 to about 2 inches wide and from about 3 to 15 feet long and made from a flexible, stretchable material. The main strap 26 may terminate with a rod handle loop 22 adapted to fit over a handle 12 of the fishing rod 10. An adjustment buckle 38 may be used to adjust the size of the loop 22 as well as the length of the main strap 26. The main strap 26 may have a length sufficient to allow the loop 22 to fit over the end of the rod 10 and be secured against the reel 36.

One or more fastening straps 20 may be disposed along the length of the main strap 26. The fastening straps 20 may be adapted to wrap around the fishing rod 10 to secure the rod 10 to the main strap 26. The fastening straps 20 may also wrap around the fishing line 32 to secure the line 32 to the main strap 26. The fastening straps 20 may be from about 4 to about 12 inches long and can be made of a flexible, sturdy, breathable material. The fastening straps 20 may include a fastener to secure it about the rod 10. For example, the fastening straps 20 may include hook and loop material to provide quick and convenient securing of the straps 20 about the rod 10.

While the figures show a single fishing rod 10 secured in the tool of the present invention, the tool may be used to secure not only one rod, but multiple rods. In some embodiments, the tool may be customized to include more than one main strap and loop, allowing one or more rods of a first length and one or more rods of a second length to be stored in the same storage chamber.

The main strap may include the adjustment buckle, as described above, or may be customized for a user depending on the length of their rod. In some embodiments, the tool may be designed for specific sized poles, such as one tool for 6 foot poles, one tool for 8 foot poles, and the like.

It should be understood, of course, that the foregoing relates to exemplary embodiments of the invention and that modifications may be made without departing from the spirit and scope of the invention as set forth in the following claims.

What is claimed is:

1. A fishing tool comprising:
    a storage chamber having an open end and a closed end;
    a main strap extending from the storage chamber;
    a loop formed on a distal end of the main strap, the loop adapted to fit about a handle of a fishing rod; and
    one or more fastening straps extending from the main strap between the loop and the storage chamber.

2. The fishing tool of claim 1, wherein the storage chamber is a hollow cylinder.

3. The fishing tool of claim 1, further comprising a buoyant material disposed at the storage chamber's closed end.

4. The fishing tool of claim 1, further comprising a fishing rod support disposed inside the storage chamber.

5. The fishing tool of claim 3, further comprising a notch in the buoyant material adapted to allow the main strap to pass therethrough.

6. The fishing tool of claim 1, further comprising an adjustment buckle adapted to adjust a size of the loop and a length of the main strap.

7. The fishing tool of claim 1, wherein the main strap is made of a flexible, stretchable material.

8. A fishing travel tool comprising:
    a storage chamber having an open end and a closed end;
    a buoyant material disposed at the storage chamber's closed end;
    a fishing rod support disposed inside the storage chamber;
    a main strap extending from the storage chamber;
    a loop formed on a distal end of the main strap, the loop adapted to fit about a handle of a fishing rod;
    an adjustment buckle adapted to adjust a size of the loop and a length of the main strap; and
    one or more fastening straps extending from the main strap between the loop and the storage chamber.

9. The fishing tool of claim 8, wherein the storage chamber is a hollow cylinder.

10. The fishing tool of claim 8, wherein the main strap is made of a flexible, stretchable material.

\* \* \* \* \*